United States Patent [19]
Taylor

[11] Patent Number: 5,343,969
[45] Date of Patent: Sep. 6, 1994

[54] TWO WHEELED BATTERY POWERED TRAILER DOLLY

[75] Inventor: Randell Taylor, Mojave, Calif.

[73] Assignee: E Z Duz It, Inc., Las Vegas, Nev.

[21] Appl. No.: 898,100

[22] Filed: Jun. 12, 1992

[51] Int. Cl.$^5$ .............................................. B62D 51/04
[52] U.S. Cl. .................................... 180/19.1; 180/11; 180/14.1
[58] Field of Search ....................... 180/19.1, 11, 14.1, 180/19.2, 19.3; 280/47.24; 254/8 R

[56] References Cited

U.S. PATENT DOCUMENTS

| | | | |
|---|---|---|---|
| 3,896,893 | 7/1975 | Willis | 180/19.1 |
| 4,210,217 | 7/1980 | Lachowicz | 180/19.1 X |
| 4,289,212 | 9/1981 | Immel | 180/19.1 |
| 4,615,406 | 10/1986 | Bottenschein et al. | 180/19.1 |
| 4,811,988 | 3/1989 | Immel | 180/19.1 X |
| 4,836,320 | 6/1989 | Sundin | 180/19.1 |

Primary Examiner—Margaret A. Focarino
Assistant Examiner—C. Mattix
Attorney, Agent, or Firm—Townsend and Townsend

[57] ABSTRACT

The invention is a two-wheeled, battery powered, trailer dolly that may be coupled to a boat or other vehicle for facilitating the movement of such vehicles. A deep-discharge, marine battery powers a winches which operates the axle of the dolly. The axle has an inner collar at each end with abutment portions that interact with similar abutment portions on an outer collar in connection with the wheels. The use of the inner and outer collar arrangement provides for separate turning of each wheel through turns. The dolly utilizes a trailer ball in order to allow a rotatable coupling of the trailer at the ball and not on a trailer jack as shown in prior art.

1 Claim, 5 Drawing Sheets

TWO WHEELED BATTERY POWERED TRAILER DOLLY

BACKGROUND OF THE INVENTION

1. Field of the Invention

The invention relates to the field of motorized dollies that assist in the movement of various types and sizes of trailers especially those carrying boats. More specifically, the dolly is a two wheeled, battery powered, electric winch driven dolly that uses high floatation, all terrain tires to facilitate usage.

2. Description of the Prior Art

While there are motorized dollies, none that applicant is aware of are battery powered electric winch driven. The dolly also utilizes a ball in connection with an adjustable ring that allows the trailer to be pulled by its coupling and not the trailer jack. No prior art that applicant is aware of uses high floatation all terrain tires in this sort of application.

SUMMARY OF THE INVENTION

The invention is a two wheeled battery powered dolly that is hitched to trailers and other vehicles to assist in the movement thereof. The two wheels are turned by a live axle that is chain driven by an electric winch powered by a deep cycle, marine-discharge battery. The construction of the wheel hub and axle assembly allows each wheel to turn separately and independently of the other wheel for up to about ½ revolution to facilitate cornering. The winch is connected to left and right hand controls which allow one to vary the direction of the winch and hence, the direction of the dolly.

It is an object of the invention to provide an battery powered dolly to facilitate the movement of large vehicles e.g. trailers and boats.

Another object of the invention is to provide a dolly with a wide wheel base that can move various weights and sizes of trailers and can make turns without scrubbing one tire on the ground as a turn is made.

Yet another objective is to provide a dolly that is portable and eliminates the use of an extension cord for power.

Another it to provide a dolly that can enable one person to perform the movement of heavy vehicles over moderate grades and through turns in a restricted area with a minimum amount of physical effort.

Other objectives of the invention will become apparent to those skilled in the art once the the invention has been shown and described.

DESCRIPTION OF THE PREFERRED EMBODIMENT

Figure 1:
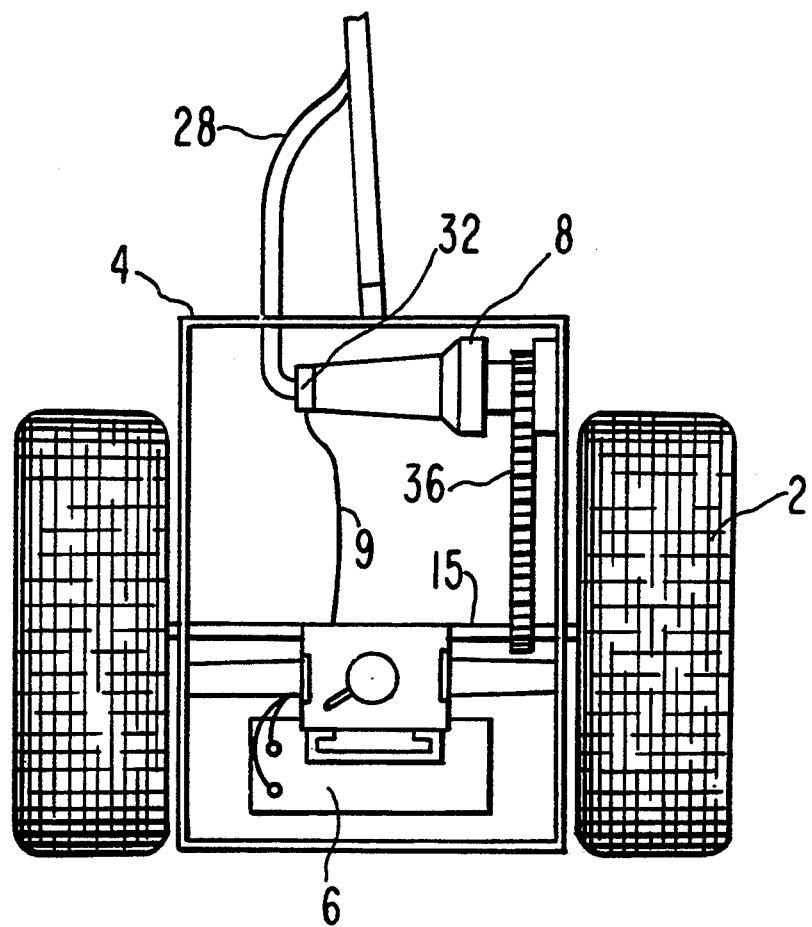
FIG. 1 shows overall construction of the dolly seen from the top

The battery powered dolly is as shown in FIG. 1. The dolly has two wheels 2 mounted to a low-lying, wide wheel base 4. It is preferred that the wheel base be about 39" o.d. in width. The tires should also be especially large with size of about 18" diameter and 11" in width being the preferred size.

The tires should be especially chosen in order to operate in this type of application. It is preferred that high floatation/all terrain tire be used. By this term it is meant that the tires be oversized in order to prevent them from being buried in the sand and mud and other soft surfaces that the dolly may be used on when it is towing a trailer with a boat for launching. These tires would also preferably be of soft rubber rated at very low air pressure about 6 p.s.i. max. Due to their soft design, size, low air pressure and tread design, this tire will have a much higher degree of traction that other types on various surfaces. Tires with greater pressure tend to bog down.

A battery 6 is located on the dolly frame and is electrically connected by leads 9 to the motor of the winch 8 or other means that provides for mechanical turning movement. The turning movement of the winch is imparted to the axle 16 through a chain 36 or other means. The axle is connected to the wheels through a collar arrangement to be presently described. The battery would preferably be a deep discharge battery, commonly known as a marine battery. This is because the battery needs to be one which can deliver large currents for short periods and be deep cycled constantly without loss of performance.

Figure 6:
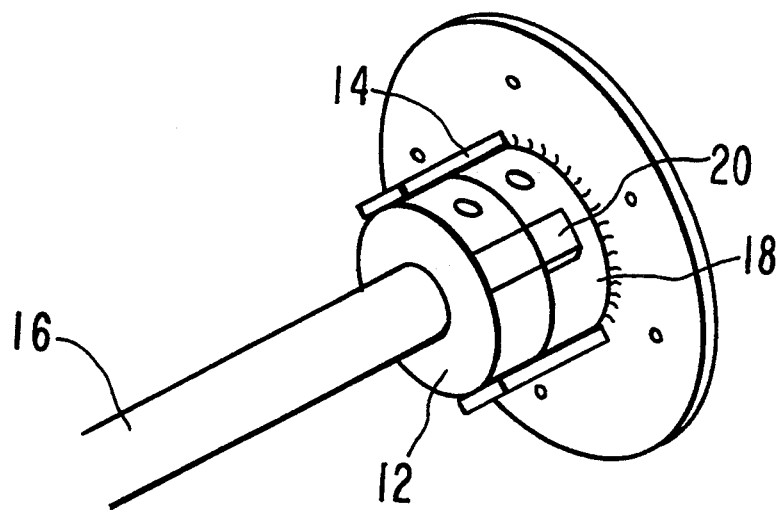
FIG. 6 Hub assembly
Figure 2:
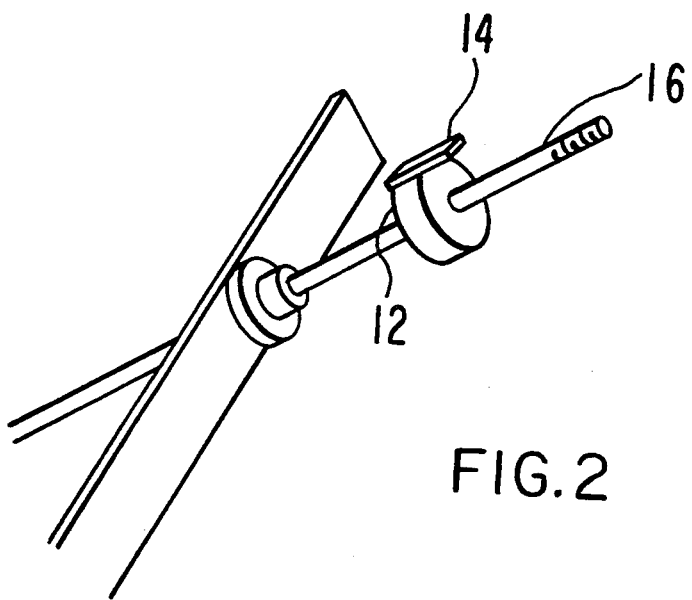
FIG. 2 shows details of the inner hub assembly.
Figure 3:
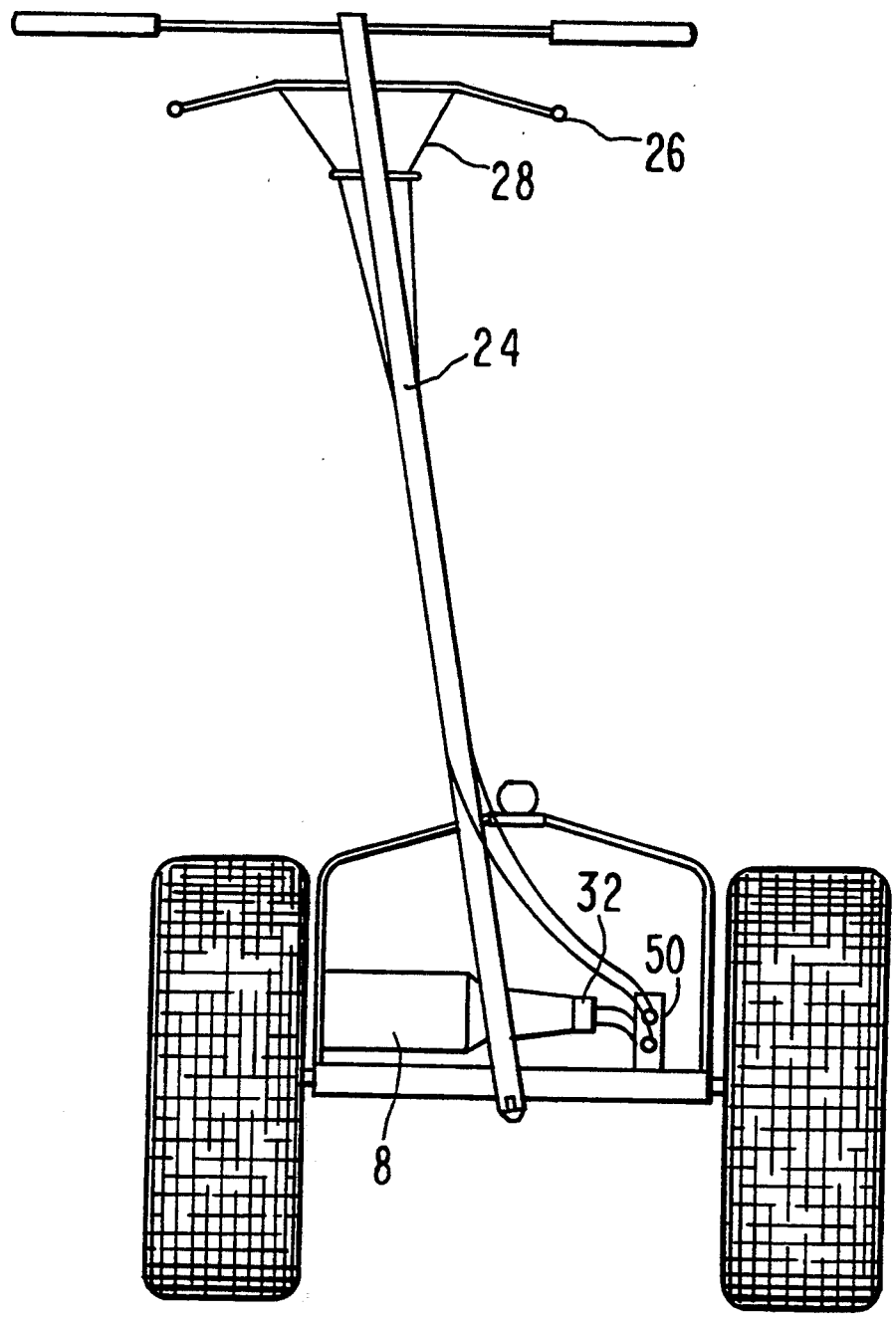
FIG. 3 shows details of the hand controls from the rear

The axle 16 has an inner collar 12 at each end, see FIG. 2. This inner collar has an abutting means 14 which revolves as the axle revolves. An outer collar 18 is arranged on the inside of the wheel (the outer collar is "outer" in relation to the inner collar). The outer collar has at least two abutment means 20 shown in FIG. 6. One of these abutment means will abut piece 14 on the inner collar since 14 overlaps the outer collar to some extent. This engagement of the two abutment pieces (one on the inner collar and one on the outer collar) transmits the power from the turning axle to the wheel.

This arrangement permits the two wheels to turn independently of one another as one goes through turns in order to avoid "scrubbing." This is a sort of skidding effect of a tire when both tires are directly connected to one another as they turn together. This results from the sideways movement of the wheel if it has to move across its normal course of movement, i.e. a vector component of the movement that is perpendicular to the normal line of travel causes the scrubbing.

Figure 5:
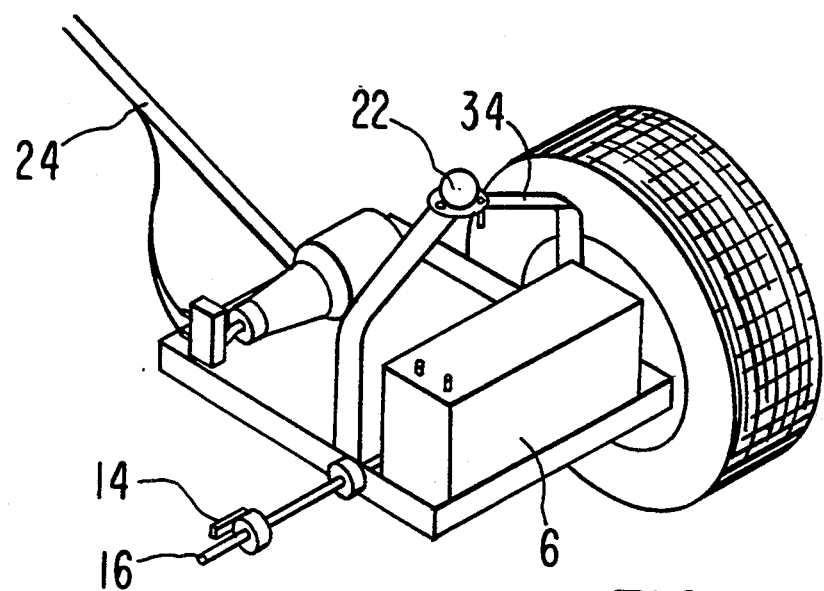
FIG. 5 shows front view of dolly
Figure 4:
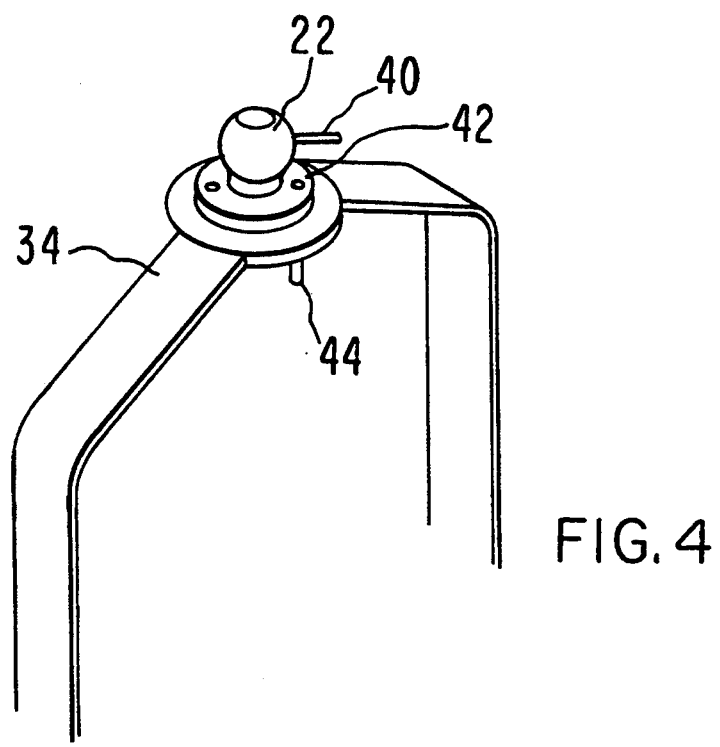
FIG. 4 shows details of the trailer ball hitch.

The collar arrangement in combination with the ball joint 22 provides for proper turning of the dolly under most circumstances. The ball joint provides for rotation of the coupling 50 that hitches the trailer to the dolly and thus enables the dolly to be turned initially in the left or right direction as a turn is approached, see FIGS. 5 and 8. The turning movement is accomplished through the use of the steering column 24.

As the dolly is pointed in the appropriate direction for an upcoming turn, either left or right, each wheel will then turn independently of the other. In both cases, the wheels will turn in a direction opposite to one another through the turn.

The collar arrangement enables whatever wheel hub that is on the inside during the turn to disengage from the inner collar abutment. This prevents the inside wheel from being scrubbed on the ground through the turn, an important consideration when the trailer being towed is substantially heavy. The arrangement allows power to continue to be provided to the axles through the turn. If the turn is substantially sharp it may become necessary to disengage the power to the axle by turning of the winch.

The power control 26 is preferably attached to the steering column 24 and allows one to vary the amount of power supplied to the winch or other means. It should also provide for reverse power. The control should be a single piece attached to the handle that may be controlled by hand. The control pivots around a point on the steering column. Mechanical leads 28 connect the hand control to a control means 32 on the winch allows one to vary the amount of power as well as the direction of the winch.

Figure 7:
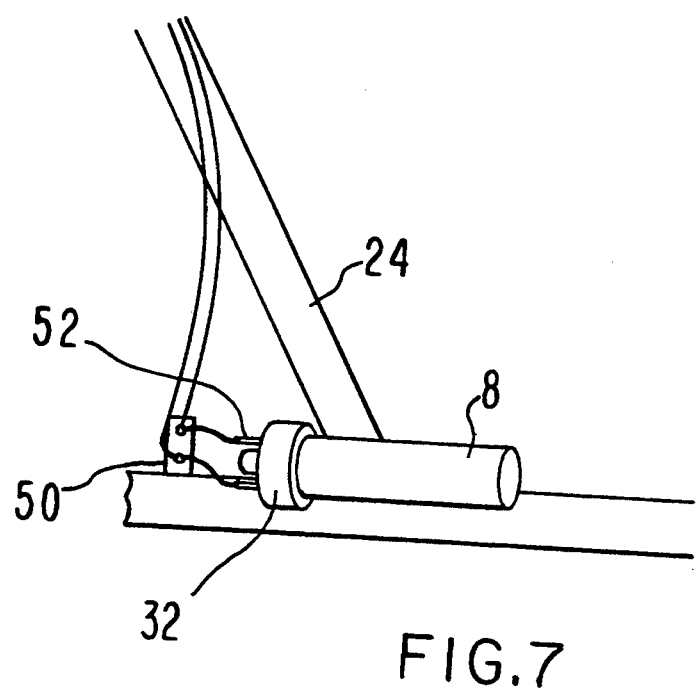
FIG. 7 shows detail winch control

The control means 32 may turn in one direction for forward and in the opposite direction for reverse movement of the winch. The amount of the this turn controls the amount of power. The leads are secured by a guide 50 on the frame to one of two attachment points 52 on the control, see FIG. 7. Squeezing on the handle control 26 turns the motor control 32 through the leads. Squeezing one of the handle controls operates forward and squeezing the other side of the control provides reverse power.

Figure 8:
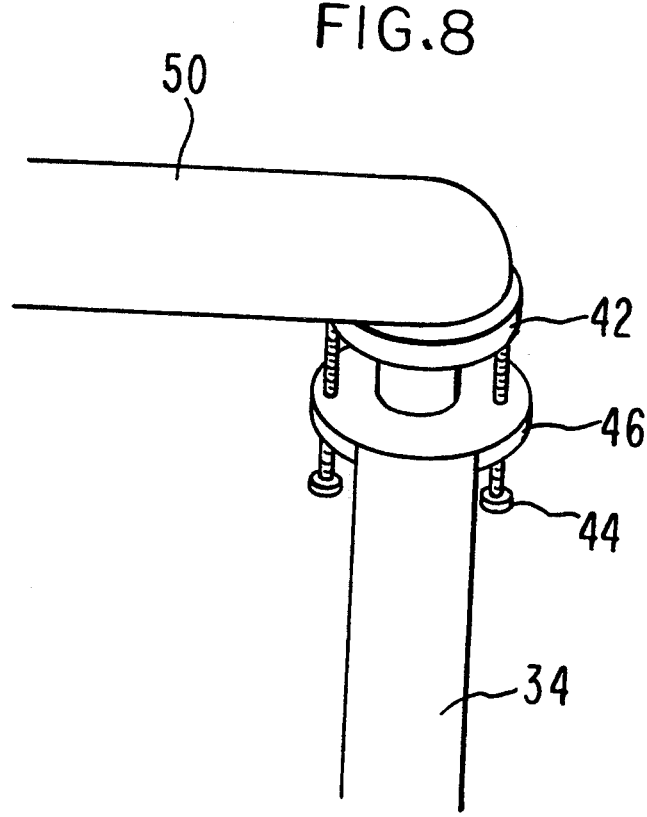
FIG. 8 detail of trailer coupling and ball hitch

The trailer hitch has a ball shaped portion 22 of about 2" in diameter attached to the top of a shank, see FIG. 8. An adjustment plate 42 is used in connection with the ball and moves up or down to secure the ball joint to a hitch 50 on the trailer. The plate is attached to a fixed portion 46 of the superstructure 34 through at least one threaded bolt 44. Turning on the bolt raises or lowers the plate 42 in relation to 46. When the hitch is placed on top of the ball joint the plate is then secured against the bottom of the hitch for a secure connection. The super structure 34 supports the ball joint at a point above the rest of the dolly. 40 is an attaching means for the ball joint that secures the ball joint to an upraised portion of the structure 42. This allows ball joints of different size to be secured onto 42 for different sized hitches.

Lights may be added to the frame in order to provide visibility at night. Other options include changes in the sizes of the axles, the tires, the tire pressures, the size of the winch and other adaptations that could improve on the basic design. A steerable third wheel may also be added to the design. The steering could be by manual, hydraulic, electric or pneumatic means.

I claim:

1. A battery powered dolly to assist in the towing of vehicles comprising: a superstructure; left and right wheels on the superstructure, a wheel base having at least one planar portion, a battery secured to said wheel base, an axle having an inner collar at each end, each of said wheels having an outer collar rotatably connected to said axle, a first key stock in connection with said inner collar and a second key stock in connection with said outer collar; said key stocks abutting one another during the movement of said inner collar so that said wheels may turn independently of one another for a fraction of a revolution of each, winch means in electrical connection with said battery, said winch means attached to said axle for turning said wheels, a handle in connection with said wheel base, said handle having pivoting control means for supplying power from said battery to said winch, said pivoting control means for supplying power to said winch in one direction when said pivoting control means is turned in one direction and for supplying power to said winch means in the other direction when said pivoting control means is pivoted in the other direction so that said dolly may be powered in different directions by the movements of said pivoting control means.

* * * * *